UNITED STATES PATENT OFFICE.

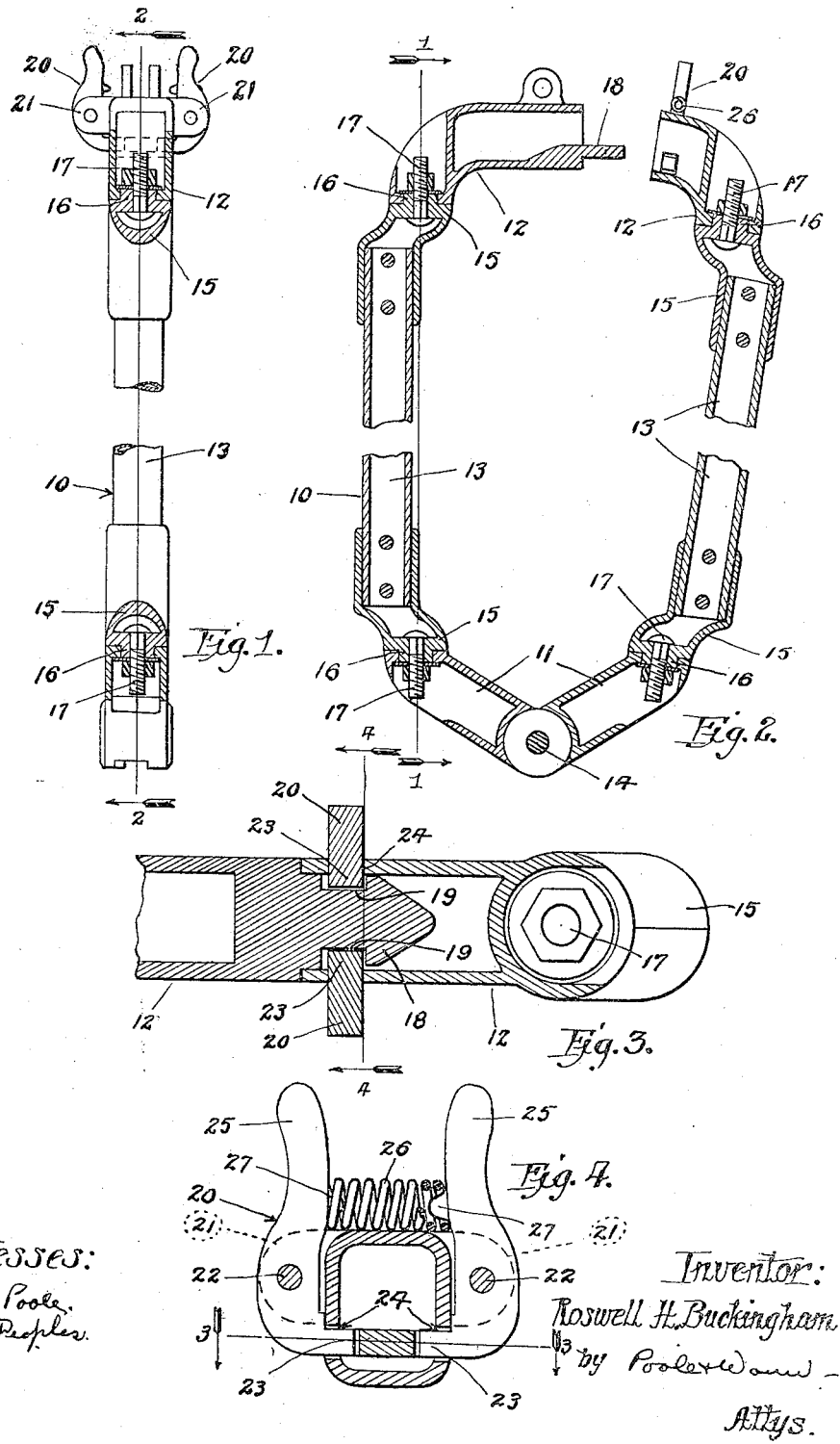

ROSWELL H. BUCKINGHAM, OF MOLINE, ILLINOIS, ASSIGNOR TO J. E. PORTER COMPANY, OF OTTAWA, ILLINOIS, A CORPORATION OF ILLINOIS.

LOCK FOR CATTLE-STANCHIONS.

1,205,153.  Specification of Letters Patent.  Patented Nov. 21, 1916.

Original application filed June 8, 1914, Serial No. 843,791. Divided and this application filed April 5, 1915. Serial No. 19,144.

*To all whom it may concern:*

Be it known that I, ROSWELL H. BUCKINGHAM, a citizen of the United States, and a resident of Moline, in the county of Rock Island and State of Illinois, have invented certain new and useful Improvements in Locks for Cattle-Stanchions; and I do hereby declare that the following is a full, clear, and exact description thereof, reference being had to the accompanying drawings, and to the letters of reference marked thereon, which form a part of this specification.

This invention relates to cattle stanchions and more particularly to means for detachably connecting the side bar members of the stanchion to permit the stanchion to be locked and unlocked for the purpose of retaining or releasing the neck of an animal to be held thereby.

The subject matter of my present invention is set forth in a Patent No. 1,134,255, granted to me on April 6, 1915, and of which this is a divisional application.

The object of my invention is to provide a construction for a locking device of the character described, adapted to be used in connection with a stanchion, comprising a two-part frame, hinged or pivoted at its lower end and designed to be detachably connected at its upper end to admit the head of the animal.

The particular features of my invention are directed to the locking means employed, whereby the stanchion may be easily locked or unlocked, and so constructed as not to be subject to accidental manipulation by the movements of the animal.

The features of my invention will be understood from the following description in connection with the accompanying drawings, in which—

Figure 1 is a vertical sectional view taken on line 1—1 of Fig. 2, and showing a cattle stanchion embodying a locking device constructed in accordance with my invention. Fig. 2 is a sectional view, taken on line 2—2 of Fig. 1, and showing the locking device in unlatched position; Fig. 3 is an enlarged view in section, taken on line 3—3 of Fig. 4, showing the locking tongue and locking members in engagement therewith; and Fig. 4 is an enlarged view in section, taken on line 4—4 of Fig. 3, showing the locking members in elevation and in engaged position with the locking tongue.

Referring to the drawings, a stanchion to which the locking device is particularly applicable comprises two members 10, 10, each consisting of end members 11, 11 and 12, 12 and intermediate or side bar members 13, 13. The lower end members 11, 11 are hinged or pivotally connected at their adjacent ends by means of a pivot bolt 14 extending through apertures formed in said overlapping end portions. The intermediate or side bar members 13, 13 are provided at their ends with offset fittings or connecting members 15, 15 fixed to the side bar members. The outer ends of the connecting members are provided with bearing surfaces adapted to engage bearing surfaces formed on the adjacent ends of the end members 11, 12, said surfaces of the end members being provided with hexagonally or rectangularly shaped apertures adapted to receive similarly shaped lugs or projections 16, 16 formed on the end surfaces of said offset connecting members. A plurality of bolts 17, 17 extend through the engaged ends of the end members and offset connecting members, and act to securely connect the end and side bar members and to permit rotative movement or adjustment of said side bar members relatively to the end members. As fully set forth and claimed in my above mentioned patent, the provision of the offset connecting members, and the manner of connecting the same with the end members, result in the shifting of the axes of rotation of the side bar members to a position laterally offset from the longitudinal axes of the side bar members. By loosening the bolts connecting the ends of the side bar and end members, and removing the lugs from their respective seats or apertures, the side bar members may be rotated about axes eccentric to or offset from the longitudinal axes of said side bar members, for the purpose of varying the distance between said side bar members and thus increase or decrease the width of the space in which the neck of the animal is retained.

Referring now more particularly to the locking device for stanchions, which constitutes the subject-matter of this invention, I provide the upper end members 12, 12 with coacting locking members, adapted to connect and disconnect the hinged side bar members above described. Said upper end members are preferably tubular in cross-section, and are adapted to engage each other in abutting relation at their ends, said end members being substantially horizontal throughout their adjacent end portions. One of said end members, namely, the left-hand member in the drawings, is of greater length than the other or right-hand end member, and extends beyond an imaginary vertical line representing the central axis of the stanchion. At the end of said left-hand member there is provided a laterally and outwardly projecting locking tongue 18, preferably formed integral with the bottom wall of the tubular end member and adapted to extend into the opening of the corresponding right-hand end member, upon which is mounted the latching mechanism. Said tongue is provided with oppositely disposed notches 19, 19 on the sides and located near the end thereof, and is further provided with a pointed extremity to facilitate its entry into locking engagement with the latching mechanism.

The latching or locking mechanism (Fig. 4) comprises a pair of oppositely disposed arms 20, 20 mounted on the right-hand end-piece adjacent to the open end thereof. Said arms are pivotally mounted or supported between pairs of lugs 21, 21 extending laterally from the opposite sides of said tubular end member, and are provided with longitudinally arranged pivot pins 22, 22 extending through apertures in said arms. Each of the arms 20 is provided at its lower end with an inwardly projecting finger 23. Said fingers extend in a direction toward each other and are adapted to project through apertures 24, 24 formed in oppositely disposed relation in the side wall of the end member. The ends of the fingers 23, 23 project inwardly beyond the side wall of the end piece and are adapted to engage the notches 19, 19 of the locking tongue 18, as shown in Fig. 3. The arms extend upwardly beyond the end member in the form of vertically disposed portions or finger pieces 25, 25, adapted to be grasped in operating the latching mechanism.

In order to maintain the arms constantly in latched position, there is preferably provided suitable tension means, comprising a compressible spring 26 inserted between and extending transversely of the upwardly projecting portions 25, 25, said spring being located immediately above the upper wall of the tubular end member. Said spring is held in place by two oppositely disposed knobs or pins 27, 27, formed on the inner faces of said arm portions 25, 25, and adapted to extend into the opposite end portions of said spring to hold the same from lateral displacement.

A cattle stanchion provided with locking mechanism as above described may be easily locked by swinging or moving the pivoted side members 10, 10 so that the upper end members approach each other, whereupon the tongue 18 enters the opening of the opposed end members and engages the pivoted locking arms, thereby separating the latching ends 23 of the arms 20, against the pressure of the spring 26, until said ends 23 come into latching engagement with the notches 19, 19 of said tongue, under the action of the spring 26, thereby firmly locking the side members together. In order to unlock the stanchion, it is necessary to manually operate the upwardly projecting ends 25 of the arm 20 simultaneously, by pressing them together against the action of spring 26, thereby disengaging the latching ends 23, 23 from the notches 19, 19 of the locking tongue 18.

The locking or latching device for cattle stanchions herein described combines a degree of simplicity in construction together with dependability in operation and manipulation that renders it particularly advantageous for use in connection with cattle stanchions. The self locking feature of the device reduces the operation of securing the animal to that of simply closing or moving the upper ends of the frame members together after the head of the animal has been inserted. The provision of a pair of similar looking arms on opposite sides of the end member, acts to prevent accidental releasing of the animal by its own efforts, in that the manipulating fingers are not accessible to the parts of the animal's body, and, further, the operation of unlatching the stanchion requires the simultaneous manipulation of both members of the device, an operation that would be difficult in any manner other than by the act of a human being.

The features of my invention may be equally well applied in connection with devices other than that herein described, and may also be modified in details of construction without departing from the spirit of my invention, and for this reason I do not wish to be limited to the construction herein described and illustrated, except in so far as specifically pointed out in the appended claim.

I claim as my invention:

A cattle-stanchion having two side members pivoted together at one end, one of said side members being provided at the opposite end with a locking member having laterally spaced walls, each of which is provided with an aperture, the other side member being provided with a locking tongue having locking notches and adapted to enter between said walls when said side members are closed together, a locking arm arranged exterior to and pivotally mounted on each of said walls, each arm being provided with a locking lug adapted to project into the space between said walls through said aperture and engage the locking notch in said tongue, and spring means acting against said arms for normally holding the same in locking position.

In testimony that I claim the foregoing as my invention I affix my signature in the presence of two witnesses, this 27th day of March, A. D. 1915.

ROSWELL H. BUCKINGHAM.

Witnesses:
F. H. COOPER,
H. C. COOPER.

Copies of this patent may be obtained for five cents each, by addressing the "Commissioner of Patents, Washington, D. C."